(12) United States Patent
Goodson, II et al.

(10) Patent No.: US 11,314,867 B2
(45) Date of Patent: Apr. 26, 2022

(54) DETERMINATIONS OF COMPROMISE OF CONTROLLER CODE IMAGES

(71) Applicant: HEWLETT PACKARD ENTERPRISE DEVELOPMENT LP, Houston, TX (US)

(72) Inventors: Stewart Gavin Goodson, II, Houston, TX (US); Daniel Humphrey, Tomball, TX (US); Robin Kel Schrader, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 99 days.

(21) Appl. No.: 16/830,976

(22) Filed: Mar. 26, 2020

(65) Prior Publication Data
US 2021/0303690 A1 Sep. 30, 2021

(51) Int. Cl.
*G06F 21/57* (2013.01)
*G06F 21/81* (2013.01)

(52) U.S. Cl.
CPC .......... *G06F 21/572* (2013.01); *G06F 21/575* (2013.01); *G06F 21/81* (2013.01)

(58) Field of Classification Search
CPC ....... G06F 21/572; G06F 21/575; G06F 21/81
See application file for complete search history.

(56) References Cited

U.S. PATENT DOCUMENTS

| | | | |
|---|---|---|---|
| 4,726,024 A * | 2/1988 | Guziak | G06F 11/0796 714/24 |
| 7,424,398 B2 | 9/2008 | Booth et al. | |
| 8,775,784 B2 | 7/2014 | Diluoffo et al. | |
| 9,292,692 B2 | 3/2016 | Wallrabenstein | |
| 9,830,456 B2 | 11/2017 | Grieco et al. | |
| 2005/0138409 A1* | 6/2005 | Sheriff | G06F 21/575 726/26 |
| 2012/0117365 A1* | 5/2012 | Navy | G06F 21/572 713/2 |
| 2015/0012737 A1* | 1/2015 | Newell | G06F 21/575 713/2 |
| 2015/0187174 A1* | 7/2015 | Oberberger | G06F 21/57 463/29 |

(Continued)

FOREIGN PATENT DOCUMENTS

| | | |
|---|---|---|
| CN | 103257872 B | 11/2016 |
| EP | 2084591 B1 | 9/2019 |

OTHER PUBLICATIONS

Wikipedia, Trusted Platform Module last edited Feb. 13, 2020 (12 pages).

(Continued)

*Primary Examiner* — Gary Collins
(74) *Attorney, Agent, or Firm* — Trop, Pruner & Hu, P.C.

(57) ABSTRACT

In some examples, a trust controller generates a first value and send the first value to a target controller of a subsystem, and generates a first verification value based on the first value and a known good code image for the target controller. The trust controller receives a second verification value from the target controller, the second verification value based on the first value and a code image to be executed at the target controller. The trust controller determines whether the code image to be executed at the target controller is compromised based on the first verification value and the second verification value.

20 Claims, 4 Drawing Sheets

(56) References Cited

U.S. PATENT DOCUMENTS

| | | |
|---|---|---|
| 2016/0055332 A1 | 2/2016 | Jeansonne et al. |
| 2017/0235957 A1* | 8/2017 | Maletsky .............. H04L 9/3242 713/168 |
| 2018/0089435 A1* | 3/2018 | Zander ................. G06F 21/575 |
| 2018/0097839 A1* | 4/2018 | Upasani ................ H04L 9/0631 |
| 2018/0189495 A1* | 7/2018 | Kim ......................... H04L 9/32 |
| 2018/0365045 A1* | 12/2018 | Hakala .................. H04L 9/3247 |
| 2018/0373524 A1* | 12/2018 | Kazi ....................... G06F 1/263 |
| 2019/0073478 A1 | 3/2019 | Khessib et al. |

OTHER PUBLICATIONS

Zachry Basnight et al., "Firmware Modification Attacks on Programmable Logic Controllers," SciVerse ScienceDirect, May 2, 2013, Elsevier, pp. 76-84.

* cited by examiner

DETERMINATIONS OF COMPROMISE OF CONTROLLER CODE IMAGES

BACKGROUND

A computing system can include a subsystem that has a controller to execute code (including machine-readable instructions) that controls an operation of the subsystem. An example of a subsystem is a power supply that supplies power to a computing system.

BRIEF DESCRIPTION OF THE DRAWINGS

Some implementations of the present disclosure are described with respect to the following figures.

Figure 1:
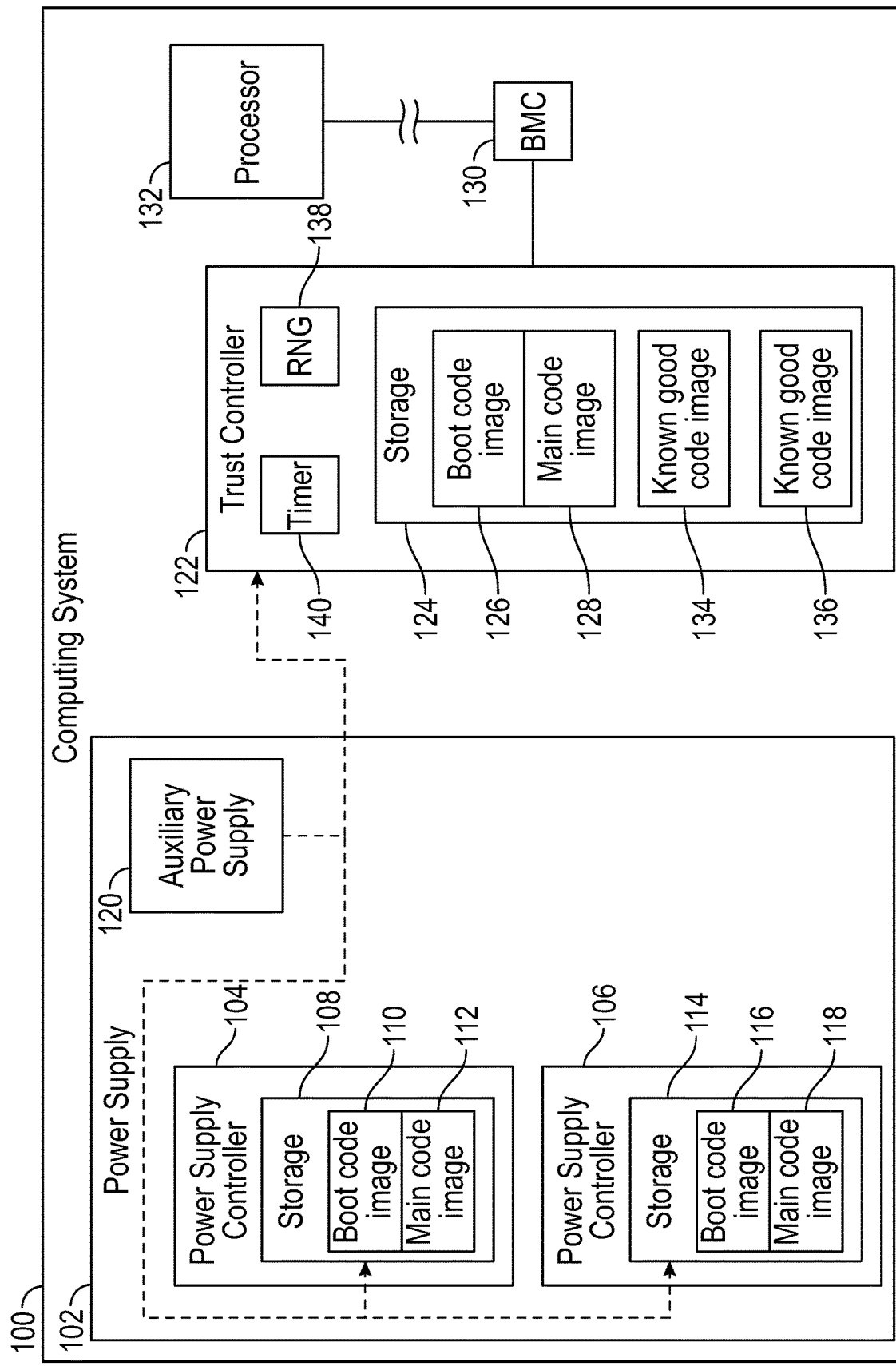
FIG. 1 is a block diagram of a computing system that includes a power supply and a trust controller according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A subsystem in a computing system can include a controller that executes code for controlling operations of the subsystem. Such code may be subject to compromise. Examples of compromised code include any or some combination of the following: code that is infected with malware, code that has been modified or replaced with malicious code by an attacker, code that contains errors or bugs that can lead to incorrect operation of the subsystem under certain conditions, or code exhibiting any fault.

In an example where the subsystem includes a power supply of the computing system, compromised code can lead to erroneous operation of the power supply that can interfere with operations of the computing system. For example, if the code of the controller of the power supply is compromised by an attacker (a human, a program, or a machine), then the attacker can disable the power supply to bring down the computing system by removing power from the computing system, which can cause loss of data and extended downtime of the computing system. In a data center (e.g., an enterprise computing environment, a cloud computing environment, a data storage farm, a communication network infrastructure, etc.) that has a large number of computing systems, an attacker can effectively disable operation of the entire data center or a large part of the data center. In other cases, compromised code of a power supply can prevent deactivation of the power supply to prevent the computing system from entering into a lower power mode for power conservation.

In some examples, trust logic (hardware or machine-readable instructions) added to a power supply can allow the trust logic of the power supply to verify the integrity of code executed by the controller of the power supply. An example of such trust logic is a Trusted Platform Module (TPM) that is designed to secure hardware using integrated cryptographic keys. However, adding circuitry (in the form of a microcontroller for example) to implement the trust logic into a power supply can increase the cost of the power supply, especially if the added circuitry is not already part of the power supply. In a data center with a large number of computing systems, the increased costs of the power supplies in the computing systems can multiply the costs of the data center.

In accordance with some implementations of the present disclosure, a trust controller can be implemented in a computing system to verify the integrity of code to be executed in a controller (or controllers) of a subsystem (or controllers of multiple subsystems) of the computing system. The trust controller can be implemented using a controller that already exists in the computing system. In such examples, the existing controller can be extended to perform trust functionality by adding code for execution by the controller. As a result, in some examples, verification of code executed by controllers of subsystems can be performed without adding hardware costs to the computing system.

In some implementations of the present disclosure, the trust controller can generate a first value (e.g., a random number or another type of value that changes over time) and send the first value to a target controller of a subsystem, such as a power supply. The trust controller generates a first verification value (e.g., a first hash value or other type of value) based on the first value and a known good code image for the target controller. The trust controller receives a second verification value (e.g., a second hash value or other type of value) from the target controller, where the second verification value is based on the first value and code image to be executed at the target controller. The trust controller determines whether the code image to be executed at the target controller is compromised based on the first verification value and the second verification value.

FIG. 1 is a block diagram of a computing system 100 according to some examples. The computing system 100 can include a server computer, a desktop computer, a notebook computer, a tablet computer, a communication node, a storage server, or any other type of computing system. In some cases, the computing system 100 can include multiple computers, such as multiple servers.

The computing system 100 includes a power supply 102 that includes a number of power supply controllers 104 and 106. In the example of FIG. 1, the power supply 102 includes two power supply controllers 104 and 106. In other examples, the power supply 102 can include just one power supply controller, or more than two power supply controllers.

As used here, a "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

The power supply controllers 104 and 106 can control provision of a higher power supply voltage and a lower power supply voltage, respectively, by the power supply 102. A higher power supply voltage is a power supply voltage used to power electronic components, where the higher power supply voltage has a higher voltage level than a lower power supply voltage used to power other electronic components. For example, the lower power supply voltage can be in a range between 2.5 volts (V) and 6 V, while the higher power supply voltage can exceed 10 V. In other examples, other higher and lower power supply voltages can be employed.

The power supply controller 104 includes a storage 108 that stores a boot code image 110 and a main code image 112. A storage can be implemented using a storage device or multiple storage devices, including a volatile memory device (e.g., a dynamic random access memory (DRAM), a static random access memory (SRAM), etc.), a non-volatile memory device (e.g., a flash memory device or another type of non-volatile memory device), or any other type of storage device. A "code image" can refer to any collection (a file or multiple files or other code containing information structures) of machine-readable instructions that are executable by a processing circuit, such as the processing circuit of a power supply controller.

The boot code image 110 is to boot the power supply controller 104 to an initial state where the power supply controller 104 is ready to perform operations of the power supply controller 104. Operations of the power supply controller 104 are performed by the main code image 112 executed on the power supply controller 104. Examples of the operations of the power supply controller 104 include causing activation or deactivation of a respective power supply voltage (e.g., a higher power supply voltage) produced by the power supply 102.

The power supply controller 106 similarly includes a storage 114 that stores a boot code image 116 and a main code image 118. Examples of the operations of the power supply controller 106 when executing the main code image 118 include causing activation or deactivation of a respective power supply voltage (e.g., a lower power supply voltage) produced by the power supply 102.

Although each storage 108 or 114 is depicted as being included in the respective power supply controller 104 or 106, in other examples, the storage 108 or 114 can be external of the power supply controller 104 or 106, but is accessible by the by the power supply controller 104 or 106.

The power supply 102 further includes an auxiliary power supply 120, which provides an auxiliary power supply voltage. In some examples, the auxiliary power supply 120 includes analog circuitry that cannot be hacked by an attacker. The auxiliary power supply 120 supplies the auxiliary power supply voltage to the power supply controllers 104 and 106 during a trust verification process when the main power supply voltages (such as the higher and lower power supply voltages noted above) are not yet available. The trust verification process verifies the integrity of code images to be executed by the power supply controllers 104 and 106.

The trust verification process is performed by a trust controller 122 in the computing system 100. The trust controller 122 can also be powered by the auxiliary power supply 120 during the trust verification process. In some examples, the trust controller 122 is located outside the power supply 102. In other examples, the trust controller 122 can be included in the power supply 102.

The trust controller 122 includes a storage 124 that stores a boot code image 126 and a main code image 128. The boot code image 126 is executed by the trust controller 122 to initialize the trust controller 122 to an initial state where the trust controller 122 can execute the main code image 128 to perform operations of the trust controller 122. The operations of the trust controller 122 can include verifying the integrity of code images of the power supply controllers 104 and 106.

The storage 124 can be included in the trust controller 122, or can be external of but accessible by the trust controller 122. In some examples, the storage 124 can further store other code (not shown) to perform other tasks. An example of such other tasks includes providing an interface to a baseboard management controller (BMC) 130.

In other examples, the trust controller 122 can be implemented as part of the BMC 130.

As used herein, a "BMC" is a specialized service processor that monitors the physical state of a computing system (e.g., 100) using sensors and communicates with a management system through an independent "out-of-band" connection. The BMC may also communicate with applications executing at an operating system (OS) level through an input/output controller (IOCTL) interface driver, a Representational state transfer (REST) application program interface (API), or some other system software proxy that facilitates communication between the BMC and applications. The BMC may have hardware level access to hardware components located in the computing system. The BMC may be able to directly modify the hardware components. The BMC may operate independently of the OS of the computing system that the BMC is located in. The BMC may be located on the motherboard or main circuit board of the computing system to be monitored. The fact that a BMC is mounted on a motherboard of the managed computing system or otherwise connected or attached to the managed computing system does not prevent the BMC from being considered separate from a processing resource (e.g., a processor 132) that executes the OS. A BMC has management capabilities to manage components of the computer system. Examples of management capabilities of the BMC can include any or some combination of the following: power control, thermal monitoring and control, fan control, system health monitoring, remote access of the computing system, remote reboot of the computing system, system setup and deployment, system security, and so forth.

In some examples, a BMC can provide so-called "lights-out" functionality for computing systems. The lights out functionality may allow a user, such as a systems administrator to perform management operations on the computing system even if an OS is not installed or not functional on the computing system. Moreover, in some examples, the BMC can run on auxiliary power (e.g., battery power); as a result, the computing system does not have to be powered on to allow the BMC to perform its operations. The services provided by the BMC may be considered "out-of-band" services, since the OS may not be running and in some cases the computing system may be powered off or is not functioning properly (e.g., the computing system has experienced a fault or hardware failure).

The BMC may include a communication interface, such as a network interface, and/or a serial interface that an administrator or other entity can use to remotely communicate with the BMC. An "out-of-band" service can be provided by the BMC via a dedicated management channel (e.g., the communication interface) and is available whether the computing system is in a powered on state.

The processor 132 of the computing system 100 is a main processor to execute system code, including an OS, firmware, an application program, and so forth. The processor 132 is able to communicate with the BMC 130 through intervening components (not shown). The processor 132 can include a microprocessor, a core of a multi-core microprocessor, a microcontroller, a programmable integrated circuit, a programmable gate array, a digital signal processor, or another hardware processing circuit.

In some examples, the trust controller 122 is able to verify the integrity of the main code image 112 or 118 of each power supply controller 104 or 106. In such examples, the boot code image 110 or 116 of each power supply controller 104 or 106 can be considered to be trusted code that an attacker is unable to compromise. For example, the boot code image 110 or 116 can be stored in a protected region of the storage 108, which can be protected using a cryptographic protection mechanism or other protection mechanism.

In other examples, the trust controller 122 can also verify the integrity of the boot code images 110 and 116.

The storage 124 of the trust controller 122 also stores known good code images 134 and 136 for the power supply controllers 104 and 106, respectively. A "known good code image" can refer to a code image that has been verified to not be corrected, or more generally, a code image that is believed by an entity, such as the computing system 100 or a user or administrator, to represent non-compromised code for a respective power supply controller. The known good code image 134 is the known good code image for the main code image 112 to be executed by the power supply controller 104. The known good code image 136 is the known good code image for the main code image 118 to be executed by the power supply controller 106.

The trust controller 122 further includes a random number generator (RNG) 138 to generate a random number. In some examples, the RNG 138 can be a pseudo-random number generator, or alternatively, a true random number generator. The RNG 138 can be implemented using hardware of the trust controller 122. In other examples, the RNG 138 can be implemented using machine-readable instructions, which can be part of or separate from the main code image 128 of the trust controller 122.

In some examples, the trust controller 122 further includes a timer 140, which can be implemented using hardware of the trust controller 122 or can be implemented using machine-readable instructions that can be part of or separate from the main code image 128 of the trust controller 122.

The random number generated by the RNG 138 in the trust controller 122 and the timer 140 can be used as part of the verifying the integrity of code images of the power supply controllers 104 and 106.

If the trust controller 122 determines that any of the code images of the power supply controllers 104 and 106 is compromised, then the trust controller 122 causes disabling of the power supply controllers 104 and 106. The disabling can be accomplished by activating reset signals that are provided to reset inputs of the power supply controllers 104 and 106, for example. More generally, the trust controller 122 can send a reset indication or any other indication to disable to the power supply controllers 104 and 106, for causing the power supply controllers 104 and 106 to remain deactivated so that the power supply does not activate its respective power supply voltages.

If the trust controller 122 determines that the code images of the power supply controllers 104 and 106 are not compromised, then the trust controller 122 enables the power supply controllers 104 and 106. Enabling the power supply controllers 104 and 106 can simply involve refraining from activating reset signals to the power supply controllers 104 and 106, or sending enable indications to the power supply controllers 104 and 106 to enable the power supply 102 to activate its power supply voltages.

Figure 2:
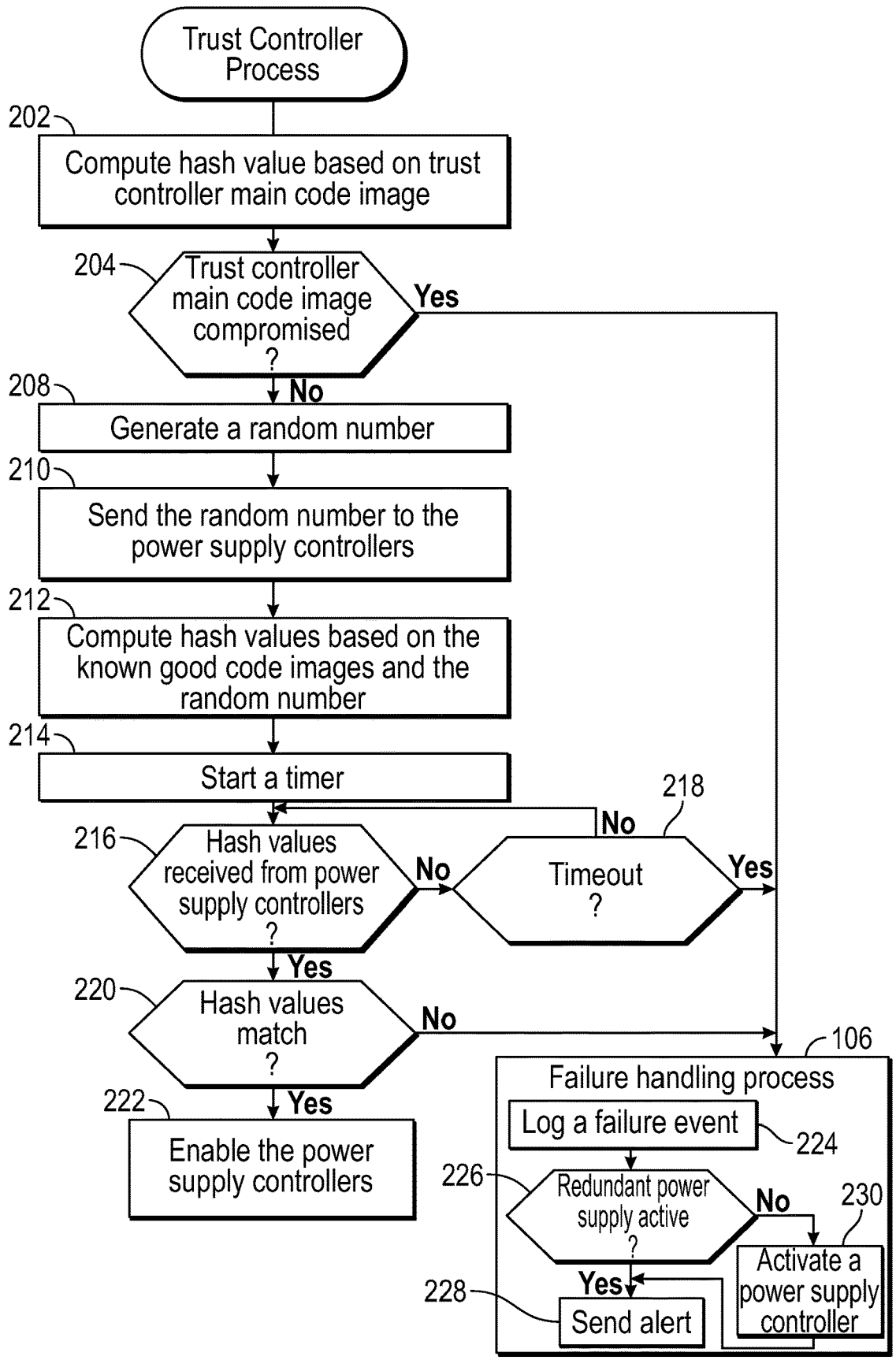
FIG. 2 is a flow diagram of a process of the trust controller according to some examples.

FIG. 2 is a flow diagram of a process performed by the trust controller 122 (such as by the main code image 128 when executed by the trust controller 122), in accordance with some examples of the present disclosure.

Although FIG. 2 depicts a specific order of tasks, it is noted that the tasks can be performed in a different order in other examples. Moreover, additional tasks may be added, or some of the tasks of FIG. 2 may be omitted, or some of the tasks of FIG. 2 can be replaced with other tasks.

Once power is supplied to the trust controller 122, such as from the auxiliary power supply 120, the trust controller 122 computes (at 202) a hash value based on the main code image 128 stored in the storage 124 of the trust controller 122. Computing a hash value based on a given piece of information, such as the main code image 128, can be based on applying a hash function to the piece of information. The hash function produces a hash value.

A hash function can refer to any function used to map data of any arbitrary size to a value of a fixed length. In some examples, the hash function can be a cryptographic hash function, which can be a one-way function. Examples of cryptographic hash functions include any of the following: a message digest function (e.g., an MD5 function), a Secure Hash Algorithm (SHA) function (e.g., SHA-1, SHA-2, SHA-3, etc.), and so forth.

The trust controller 122 determines (at 204) whether the main code image 128 of the trust controller 122 is compromised. This determination can be based on comparing the hash value derived from the main code image 128 to a pre-stored hash value (which can be stored in a secure part of the storage 124). If the hash values match, then that is an indication that the main code image 128 is not compromised. However, if the hash values do not match, then that is an indication that the main code image 128 has been compromised. In other examples, instead of using hash values to determine whether the main code image 128 is compromised, a different technique can be used for verifying the integrity of the main code image 128 of the trust controller 122.

If the trust controller 122 determines (at 204) that the main code image 128 is compromised, then the trust controller 122 performs a failure handling process 206 (discussed further below).

However, if the trust controller 122 determines that the main code image 128 is not compromised, then the trust controller 122 generates (at 208) a random number by use of the RNG 138. The trust controller sends (at 210) the random number to the power supply controllers 104 and 106.

The trust controller 122 further computes (at 212) a hash value based on each of the known good code images 134 and 136, to produce respective hash values for the power supply controllers 104 and 106. In some examples, the trust controller 122 computes a first hash value (hash value A) based on a combination that includes the random number and the known good code image 134. More specifically, the combination that includes the random number and the known good code image 134 is applied to a hash function that calculates the first hash value (hash value A). Hash value A is used to verify the integrity of the main code image 112 to be executed by the power supply controller 104. Similarly, the trust controller 122 computes a second hash value (hash value B) based on a combination that includes the random number and the known good code image 136. Hash value B is used to verify the integrity of the main code image 118 to be executed by the power supply controller 106.

In response to sending the random number to the power supply controllers 104 and 106, the trust controller 122 starts (at 214) the timer 140 for counting a timeout interval. If the power supply controllers 104 and 106 are functioning correctly (e.g., the main code images 112 and 118 have not been compromised), the trust controller 122 should receive hash values computed by the power supply controllers 104 and 106 prior to expiration of the timeout interval counted by the timer 140.

The trust controller 122 determines (at 216) if hash values produced by the power supply controllers 104 and 106, respectively, have been received by the trust controller 122. If not, the trust controller 122 determines (at 218) if the timer 140 has expired. If the timer 140 has expired before the trust controller 122 receives hash values from the power supply controllers 104 and 106, the trust controller 122 proceeds to perform the failure handling process 206.

If the timer has not yet expired, the trust controller 122 continues to check (at 216) whether the trust controller 122 has received the hash values from the power supply controllers 104 and 106. In some examples, the trust controller 122 waits for hash values to be received from all of the power supply controllers 104 and 106 before proceeding. If the trust controller 122 does not receive a hash value from any of the power supply controllers 104 and 106 when the timer 140 expires, then that indicates to the trust controller 122 that the power supply controller that has not yet sent the hash value has been compromised.

If the trust controller 122 receives the hash values from all of the power supply controllers 104 and 106, the trust controller 122 determines (at 220) if the received hash values match the corresponding hash values computed based on the known good code images 134 and 136, respectively.

The hash values received from the power supply controllers 104 and 106 include hash value A' computed by the power supply controller 104, and hash value B' computed by the power supply controller 106. Hash value A' is computed based on a combination that includes the random number (sent by the trust controller 122 to the power supply controller 104) and the main code image at 112. Hash value B' is based on a combination that includes the random number (sent by the trust controller 122 to the power supply controller 106) and the main code image 118.

The power supply controller 104 computes hash value A' and sends hash value A' to the trust controller 122. The power supply controller 106 computes hash value B' and sends hash value B' to the trust controller 122.

As part of the determination of whether the hash values match, the trust controller 122 compares hash value A' received from the power supply controller 104 to hash value A computed by the trust controller 122. If hash value A' matches hash value A, then that indicates that the main code image 112 of the power supply controller 104 has not been compromised. Similarly, the trust controller 122 compares hash value B' received from the power supply controller 106 to hash value B computed by the trust controller 122. If hash value B' matches hash value B, then that indicates that the main code image 118 of the power supply controller 106 has not been compromised. If hash value A' does not match hash value A, then that indicates that the main code image 112 of the power supply controller 104 has been compromised. If hash value B' does not match hash value B, then that indicates that the main code image 118 of the power supply controller 106 has been compromised.

If the trust controller 122 determines that none of the power supply controllers 104 and 106 has been compromised (e.g., both hash value A' matches hash value A, and hash value B' matches hash value B), then the trust controller 122 enables (at 222) the power supply controllers 104 and 106.

If the trust controller 122 determines that any of the power supply controllers 104 and 106 has been compromised (e.g., either hash value A' does not match hash value A, or hash value B' does not match hash value B), then the trust controller 122 performs the failure handling process 206.

The failure handling process 206 includes logging (at 224) a failure event that is to be communicated to a target entity, such as a user or administrator or a program or a machine. "Logging a failure event" can refer to storing information that indicates that a failure has occurred, which in some examples relates to a code image of a power supply controller being compromised.

The failure handling process 206 further includes determining (at 226) whether a redundant power supply (in addition to the power supply 102) is actively supplying power to the computing system 100. If so, the power supply 102 is maintained in an off state, and the trust controller 122 sends (at 228) an alert to a target entity, such as through the BMC 130. The sending of the alert may employ components (e.g., the processor 132 of FIG. 1 or a network interface controller) powered by the redundant power supply. An "alert" can refer to a message or any other information element.

If there is no redundant power available from a redundant power supply, as determined (at 226), the failure handling process 206 activates (at 230) either of the power supply controller 104 or 106 (or both the power supply controllers 104 and 106) to allow for power to be supplied to components of the computing system 100 for the purpose of sending (at 228) an alert to the target entity. After the power supply 102 has been powered and the alert sent, the trust controller 122 can still power off the power supply 102.

Figure 3:
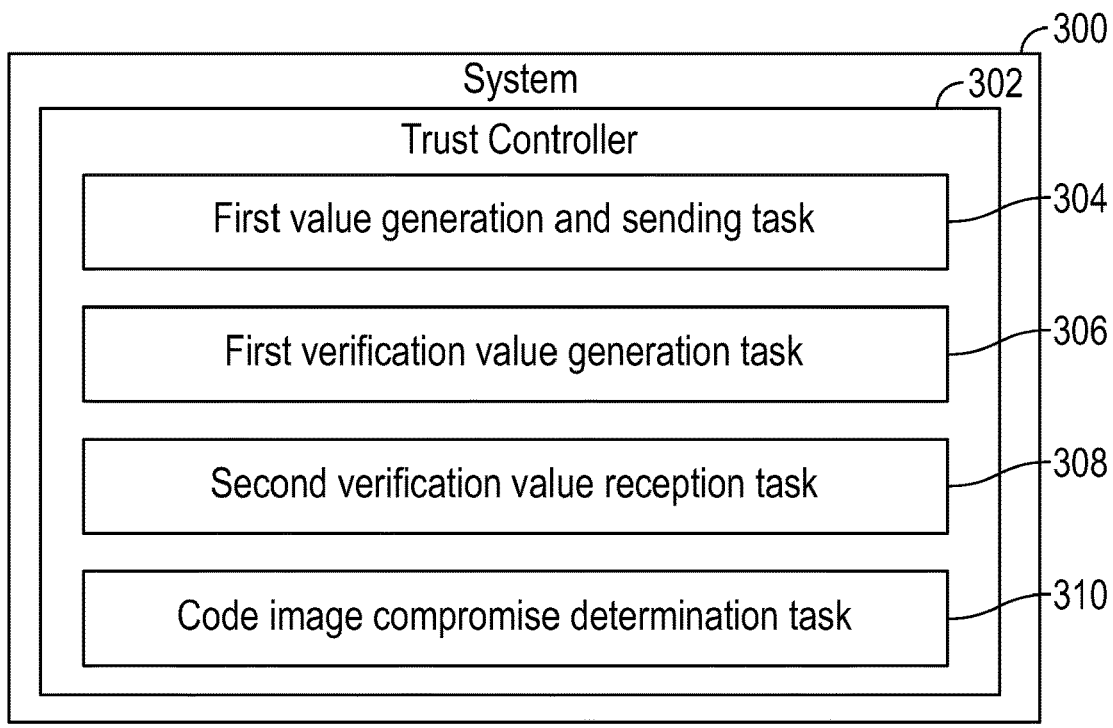
FIG. 3 is a block diagram of a system according to some examples.

FIG. 3 is a block diagram of an example system 300, which can be the computing system 100 of FIG. 1 or another computing system. The system 300 includes a trust controller 302 that is configured (programmed with code or hardware configured) to perform various tasks.

The tasks that are performed by the trust controller 302 includes a first value generation and sending task 304 to generate a first value (e.g., a random number) and send the first value to a target controller of a subsystem. In some examples, the subsystem includes a power supply (e.g., 102 in FIG. 1), and the target controller is a power supply controller (e.g., 104 or 106 in FIG. 1) of the power supply.

The tasks further include a first verification value generation task 306 to generate a first verification value (e.g., a first hash value) based on the first value and a known good code image (e.g., 134 or 136 in FIG. 1) for the target controller. In some examples, the first verification value is derived by the trust controller 302 based on applying a hash function on a combination that includes the random number and the known good code image for the target controller.

The tasks further include a second verification value reception task 308 to receive a second verification value (e.g., a hash value) from the target controller, the second verification value based on the first value and a code image (e.g., 112 or 118 in FIG. 1) to be executed at the target controller. In some examples, the second verification value is derived by the target controller based on applying a hash function on a combination that includes the random number and the code image to be executed at the target controller.

The tasks further include a code image compromise determination task 310 to determine whether the code image to be executed at the target controller is compromised based on the first verification value and the second verification value.

In some examples, the trust controller 302 is to disable the target controller of the subsystem in response to determining that the code image to be executed at the target controller is compromised.

In some examples, the system 300 includes an analog power supply (e.g., the auxiliary power supply 120 of FIG. 1) to power the trust controller 302 and the target controller during a trust establishment process. The trust establishment process includes the tasks 304, 306, 308, and 310.

In some examples, the trust controller 302 is to verify an integrity of machine-readable instructions (e.g., the trust controller's main code image 128 of FIG. 1) to be executed by the trust controller 302. The machine-readable instructions are executable on the trust controller 302 in response to verifying the integrity of the machine-readable instructions to perform the tasks 304, 306, 308, and 310.

In some examples, the trust controller 302 is to determine whether a timeout interval has expired (e.g., the timer 140 of FIG. 1 has expired). The second verification value is received from the target controller prior to expiring of the timeout interval.

In some examples, the trust controller 302 determines that the code image to be executed at the target controller is compromised responsive to expiration of the timeout interval.

Figure 4:
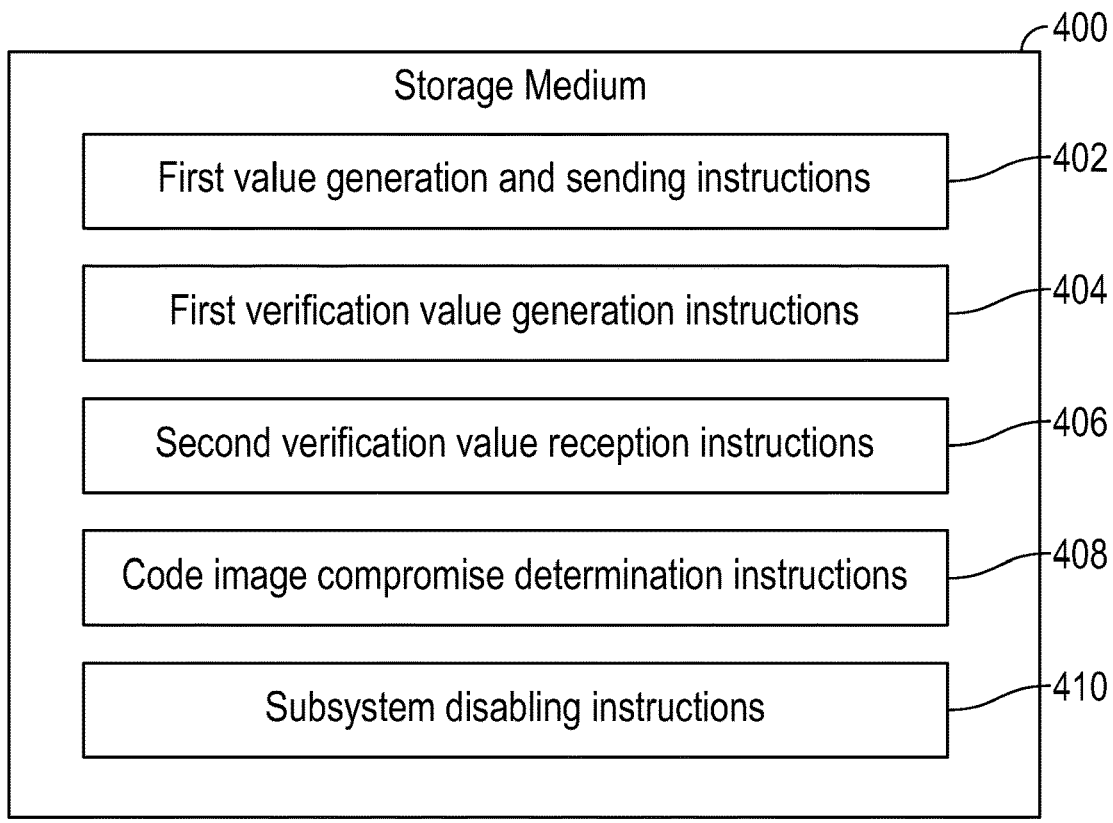
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a trust controller to perform various tasks.

The machine-readable instructions include first value generation and sending instructions 402 to generate a first value and send the first value to a target controller of a subsystem.

The machine-readable instructions include first verification value generation instructions 404 to generate a first verification value based on a combination that includes the first value and a known good code image for the target controller.

The machine-readable instructions include second verification value reception instructions 406 to receive a second verification value from the target controller, the second verification value based on a combination that includes the first value and a code image to be executed at the target controller.

The machine-readable instructions include code image compromise determination instructions 408 to determine whether the code image to be executed at the target controller is compromised based on the first verification value and the second verification value.

The machine-readable instructions include subsystem disabling instructions 410 to, in response to determining that the code image to be executed at the target controller is compromised, cause disabling of the subsystem.

In some examples, the disabling of the subsystem is based on disabling the target controller.

In some examples, the disabling of the subsystem is based on activating a reset indication to the target controller to disable the target controller.

Figure 5:
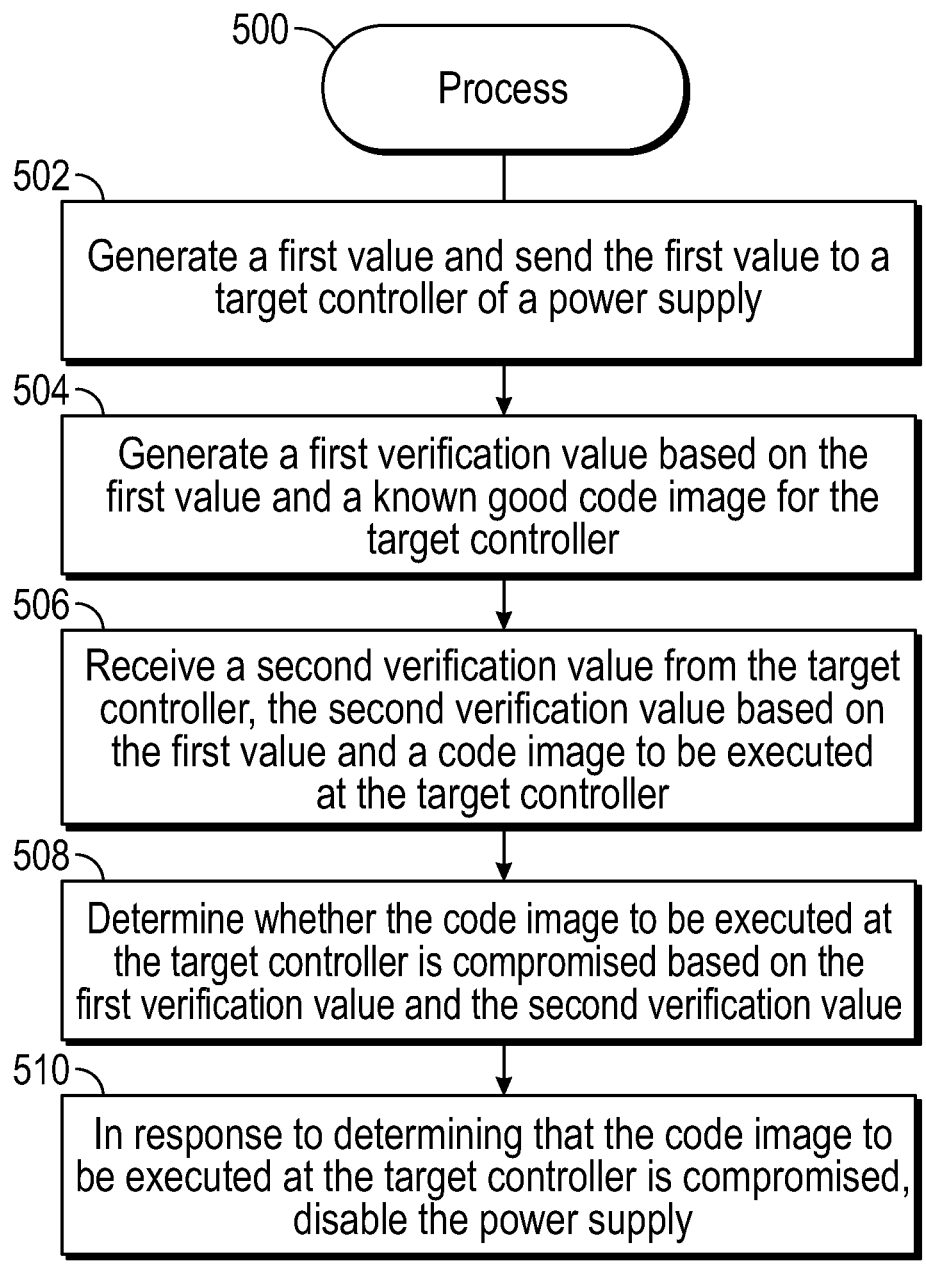
FIG. 5 is a flow diagram of a process according to further examples.

FIG. 5 is a flow diagram of a process 500 according to some examples. The process 500 includes generating (at 502) a first value and sending the first value to a target controller of a power supply.

The process 500 includes generating (at 504) a first verification value based on the first value and a known good code image for the target controller.

The process 500 includes receiving (at 506) a second verification value from the target controller, the second verification value based on the first value and a code image to be executed at the target controller.

The process 500 includes determining (at 508) whether the code image to be executed at the target controller is compromised based on the first verification value and the second verification value.

The process 500 includes, in response to determining that the code image to be executed at the target controller is compromised, disabling (at 510) the power supply.

A storage medium (e.g., 400 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:
a trust controller to:
generate a first value and send the first value to a target controller of a subsystem, wherein the subsystem comprises a power supply configured to supply power to a computing system;
generate a first verification value based on the first value and a known good code image for the target controller;
receive a second verification value from the target controller, the second verification value based on the first value and a code image to be executed at the target controller;
determine that the code image to be executed at the target controller is compromised based on the first verification value and the second verification value; and
determine whether a second power supply is available to supply power to the computing system.

2. The system of claim 1, wherein the trust controller is to disable the target controller of the subsystem in response to determining that the code image to be executed at the target controller is compromised.

3. The system of claim 1, wherein the subsystem comprises a first power supply, and wherein the trust controller is to:
in response to determining that the code image to be executed at the target controller is compromised:
in response to determining that the second power supply is not available to supply power to the system, activate the first power supply to enable generation of an alert of the compromise of the code image to be executed at the target controller.

4. The system of claim 3, wherein the target controller is configured to control an operation of the power supply.

5. The system of claim 1, comprising:
an analog power supply to power the trust controller and the target controller during a trust establishment process comprising the generating and sending of the first value, the generating of the first verification value, the receiving of the second verification value, and the determining of whether the code image to be executed at the target controller is compromised.

6. The system of claim 1, wherein the trust controller is to verify an integrity of machine-readable instructions to be executed by the trust controller, and wherein the machine-readable instructions are executable on the trust controller in response to verifying the integrity of the machine-readable instructions to perform the generating and sending of the first value, the generating of the first verification value, the receiving of the second verification value, and the determining of whether the code image to be executed at the target controller is compromised.

7. The system of claim 1, wherein the first value is a random number, the first verification value is based on a combination that includes the random number and the known good code image for the target controller, and the second verification value is based on a combination that includes the random number and the code image to be executed at the target controller.

8. The system of claim 1, wherein the trust controller is to:
determine whether a timeout interval has expired,
wherein the receiving of the second verification value from the target controller is prior to expiring of the timeout interval.

9. The system of claim 8, wherein the trust controller is to:
determine that the code image to be executed at the target controller is compromised responsive to expiration of the timeout interval.

10. The system of claim 1, wherein the first verification value is a first hash value based on applying a hashing function on a combination that includes the first value and the known good code image for the target controller, and the second verification value is a second hash value based on applying a hashing function on a combination that includes the first value and the code image to be executed at the target controller.

11. The system of claim 1, wherein the subsystem comprises a further target controller, and wherein the trust controller is to:
send the first value to the further target controller;
generate a third verification value based on the first value and a known good code image for the further target controller;
receive a fourth verification value from the further target controller, the fourth verification value based on the first value and a code image to be executed at the further target controller; and
determine that the code image to be executed at the further target controller is compromised based on the third verification value and the fourth verification value.

12. The system of claim 11, wherein the trust controller is to:
disable the target controller and the further target controller in response to determining compromise of any of the code image to be executed at the target controller and the code image to be executed at the further target controller.

13. The system of claim 1, wherein the subsystem comprises a first power supply, and wherein the trust controller is to:
in response to determining that the code image to be executed at the target controller is compromised:
in response to determining that the second power supply is available to supply power to the system, maintain the first power supply disabled.

14. A non-transitory machine-readable storage medium comprising instructions that upon execution cause a trust controller to:
generate a first value and send the first value to a target controller of a subsystem, wherein the subsystem comprises a power supply configured to supply power to a computing system;
generate a first verification value based on a combination that includes the first value and a known good code image for the target controller;
receive a second verification value from the target controller, the second verification value based on a combination that includes the first value and a code image to be executed at the target controller;
determine whether the code image to be executed at the target controller is compromised based on the first verification value and the second verification value;
in response to determining that the code image to be executed at the target controller is compromised, cause disabling of the subsystem; and
determine whether a second power supply is available to supply power to the computing system.

15. The non-transitory machine-readable storage medium of claim 14, wherein the disabling of the subsystem is based on disabling the target controller.

16. The non-transitory machine-readable storage medium of claim 15, wherein the disabling of the subsystem is based on activating a reset indication to the target controller to disable the target controller.

17. The non-transitory machine-readable storage medium of claim 14, wherein the instructions that upon execution cause the trust controller to:
in response to determining that the code image to be executed at the target controller is compromised, cause enabling of the subsystem.

18. The non-transitory machine-readable storage medium of claim 14, wherein the subsystem is a power supply comprising the target controller, and wherein the disabling of the subsystem prevents the power supply from supplying power to a system.

19. A method performed by a trust controller, comprising:
generating a first value and sending the first value to a target controller of a power supply;
generating a first verification value based on the first value and a known good code image for the target controller;

receiving a second verification value from the target controller, the second verification value based on the first value and a code image to be executed at the target controller;

determining whether the code image to be executed at the target controller is compromised based on the first verification value and the second verification value;

in response to determining that the code image to be executed at the target controller is compromised, disabling the power supply; and determining whether a second power supply is available to supply power to the computing system.

20. The method of claim 19, wherein the first value is a random number, the first verification value is based on a combination that includes the random number and the known good code image for the target controller, and the second verification value is based on a combination that includes the random number and the code image to be executed at the target controller.

* * * * *